(12) United States Patent
Matsufuji et al.

(10) Patent No.: US 9,174,856 B2
(45) Date of Patent: Nov. 3, 2015

(54) FLOATATION SEPARATION APPARATUS, METHOD OF FLOATATION SEPARATION, AND METHOD OF MANUFACTURING PRODUCTS USING THE SAME

(75) Inventors: Yasunori Matsufuji, Fukuoka (JP); Koji Takasu, Fukuoka (JP); Kiyotaka Tatsumi, Yamaguchi (JP)

(73) Assignees: JAPAN SCIENCE AND TECHNOLOGY AGENCY, Kawaguchi-shi (JP); KITAKYUSHU FOUNDATION FOR THE ADVANCEMENT OF INDUSTRY, SCIENCE AND TECHNOLOGY, Kitakyushu-shi (JP)

( * ) Notice: Subject to any disclaimer, the term of this patent is extended or adjusted under 35 U.S.C. 154(b) by 795 days.

(21) Appl. No.: 13/384,543

(22) PCT Filed: Jul. 15, 2010

(86) PCT No.: PCT/JP2010/061989
§ 371 (c)(1),
(2), (4) Date: Jan. 17, 2012

(87) PCT Pub. No.: WO2011/007837
PCT Pub. Date: Jan. 20, 2011

(65) Prior Publication Data
US 2012/0111436 A1    May 10, 2012

(30) Foreign Application Priority Data
Jul. 17, 2009   (JP) .................................. 2009-168346

(51) Int. Cl.
*B03D 1/14*      (2006.01)
*B03D 1/24*      (2006.01)
(Continued)

(52) U.S. Cl.
CPC ................ *C02F 1/24* (2013.01); *B03D 1/1418* (2013.01); *B03D 1/1462* (2013.01);
(Continued)

(58) Field of Classification Search
CPC ..................................................... B03D 1/1418
See application file for complete search history.

(56) References Cited

U.S. PATENT DOCUMENTS 5,277,317 A   1/1994   Zlobin et al.
5,382,358 A   1/1995   Yeh
(Continued)

FOREIGN PATENT DOCUMENTS

CN   101284257 A   10/2008
DE      4422034 C1    8/1995
(Continued)

OTHER PUBLICATIONS

International Search Report of PCT/JP2010/061989, mailing date of Nov. 2, 2010.
(Continued)

*Primary Examiner* — Thomas M Lithgow
(74) *Attorney, Agent, or Firm* — Westerman, Hattori, Daniels & Adrian, LLP

(57) ABSTRACT

By storing a liquid to be treated in a treatment tank main body 10 having a bottom portion 10g that narrows downward, with particles of materials to be treated dispersed therein, taking out the liquid to be treated from a position lower than the liquid level of the treatment tank main body 10, and returning the liquid to the bottom portion 10g of the treatment tank main body 10, thereby circulating the liquid to be treated while forming a vortex flow within the treatment tank main body 10, and at the same time supplying air bubbles from the lower part of the treatment main unit 10, a first component contained in froths is separated from a second component, which is less susceptible to floatation, contained in the liquid to be treated.

10 Claims, 9 Drawing Sheets

(51) Int. Cl.
*C02F 1/24* (2006.01)
*C04B 18/08* (2006.01)
*C04B 28/02* (2006.01)

(52) U.S. Cl.
CPC .............. *B03D 1/1475* (2013.01); *B03D 1/24* (2013.01); *C04B 18/08* (2013.01); *C04B 28/02* (2013.01); *B03D 1/247* (2013.01); *B03D 2203/08* (2013.01); *C02F 2301/024* (2013.01); *C02F 2301/026* (2013.01); *Y02W 30/92* (2015.05); *Y10T 137/2076* (2015.04)

(56) References Cited

U.S. PATENT DOCUMENTS

| | | | | |
|---|---|---|---|---|
| 5,792,363 | A | * | 8/1998 | Rodgers .................. 210/704 |
| 7,108,136 | B2 | * | 9/2006 | Imhof ...................... 209/170 |
| 2005/0242000 | A1 | | 11/2005 | Khan et al. |
| 2010/0011995 | A1 | | 1/2010 | Nakamura et al. |

FOREIGN PATENT DOCUMENTS

| | | |
|---|---|---|
| JP | 30-013302 Y1 | 9/1955 |
| JP | 42-017554 B1 | 9/1967 |
| JP | 48-046150 A | 7/1973 |
| JP | 50-082071 U | 7/1975 |
| JP | 51-076668 A | 7/1976 |
| JP | 51-133962 A | 11/1976 |
| JP | 3-126652 A | 5/1991 |
| JP | 10-059759 A | 3/1998 |
| JP | 2003-190708 A | 7/2003 |
| JP | 2007-167825 A | 7/2007 |
| JP | 2007-217244 A | 8/2007 |
| JP | 4210358 B2 | 1/2009 |
| JP | 2010-094594 A | 4/2010 |
| WO | 2008/069115 A1 | 6/2008 |

OTHER PUBLICATIONS

Chinese 1st Office Action dated Jan. 28, 2013, issued in CN Application No. 201080041469.X (7 pages).

Chinese 2nd Office Action dated Sep. 23, 2013, issued in CN Application No. 201080041469.X (5 pages).

Chinese 3rd Office Action dated Apr. 1, 2014, issued in CN Application No. 201080041469.X (5 pages).

Chinese 4th Office Action dated Oct. 10, 2014, issued in CN Application No. 201080041469.X (3 pages).

* cited by examiner

- ● : F0 Under water at 20°C
- △ : F0 Under local water
- □ : F0 Sealed at 20°C
- ◇ : F0 In the atmosphere
- ● : F1 Under water at 20°C
- △ : F1 Under local water
- □ : F1 Sealed at 20°C
- ◇ : F1 In the atmosphere
- ● : F2 Under water at 20°C
- △ : F2 Under local water
- □ : F2 Sealed at 20°C
- ◇ : F2 In the atmosphere

FLOATATION SEPARATION APPARATUS, METHOD OF FLOATATION SEPARATION, AND METHOD OF MANUFACTURING PRODUCTS USING THE SAME

TECHNICAL FIELD

The present invention relates to a device for separating particles dispersed in a liquid to be treated by floatation separation, the method of the floatation separation, and a method of manufacturing products using the device and the method by decreasing unburnt carbon contained in fly ash, for example.

BACKGROUND ART

Fly ash discharged in large amounts as a byproduct from a pulverized coal firing boiler of a thermal power plant, etc. is used in many fields, as a cement raw material, for example.

Fly ash usually contains unburnt carbon. It is known that if the unburnt carbon content is high, unburnt carbon-related problems may arise. For example, when fly ash is used as a cement admixture, high fly ash content may increase the usage of admixtures such as AE agent, cause black portions to appear on a hardened material, or physical properties of the hardened material may degrade. For these reasons, fly ash has not been used in large amounts.

To solve these problems, some methods of reforming fly ash by decreasing unburnt carbon contained in fly ash have been presented. For example, a method of separating unburnt carbon by floatation separation using the difference in wettability between unburnt carbon and ash content is known.

With the method and device for stabilizing coal ash for concrete disclosed in Patent Literature 1, a cylindrical slurry mixer shown in FIG. 3 of Patent Literature 1 is used. This slurry mixer includes a feed pipe for supplying coal ash, water filling pipe, bubble discharge pipe, air pressure-feed pipe, ash discharge pipe, pipe for discharging iron content, and agitation plate having perforated rotating plates and integrating an electrical magnet. Each pipe is equipped with a control valve.

In Patent Literature 1, water containing coal ash and a surface active agent is fed into the slurry mixer, and the mixture is agitated using the agitation plate while air is pressure-fed into the slurry mixer to generate bubbles. Carbon dioxide in air is used to decrease the basicity of highly alkaline fly ash, and iron content is separated using the magnet included in the agitation plate. While the above operations are performed, unburnt carbon is separated, entrained in bubbly ash discharged.

The unburnt carbon removing method disclosed in Patent Literature 2 adds water to fly ash to make a slurry mixture. Using the shearing force of agitation blades rotating at high speed in a surface modification device, activation energy is generated on the surface of unburnt carbon to allow the unburnt carbon to have lipophilic property, and make a collecting agent attach to the lipophilic unburnt carbon. The unburnt carbon is then made to attach to air bubbles by using a floatation machine to cause floatation separation to occur, and the unburnt carbon in fly ash can thus be separated.

The floatation machine shown in FIGS. 4 and 5 in Patent Literature 2 includes a plurality of chambers created by dividing a tank with partition walls, an agitator provided within each chamber, an external pipe including an air induction pipe and a hood installed around each agitator, a froth discharge path provided on both sides of the tank, and a plurality of waterwheel-shaped froth scrapers.

With this floatation machine, the slurry supplied through the slurry inlet on the upstream end face flows into the chambers separated with the partition walls. The slurry is agitated in each chamber by the agitators, and air is sucked in through the air induction pipe to generate air bubbles. Unburnt carbon attaching to these air bubbles goes up, is scraped to outside the tank with the froth scrapers, flows down to the froth discharge path, and then discharged to outside the machine through an aggregated froth path. The fly ash remaining within the tank is discharged with water to outside the machine as tails through a takeout port on the downstream end face.

CITATION LIST

Patent Literature

Patent Literature 1: JP 4210358 B, FIG. 3
Patent Literature 2: JP 2007-167825 A, FIGS. 4 and 5

SUMMARY OF INVENTION

Technical Problem

However, neither of the fly ash reforming techniques disclosed in the above prior literatures has solved the following disadvantages. With the technique disclosed in Patent Literature 1, since separation cannot be performed efficiently, treatment requires long time, thus inhibiting sufficient productivity from being obtained. With the technique disclosed in Patent Literature 2, the floatation machine becomes complicated and large, requiring extremely large installation space and high facility cost. It is therefore impossible for small to medium fresh concrete factories to install such facilities.

The floatation separation technique is generally used for separation of many other materials to be treated, in addition to fly ash. However, since large equipment is necessary and separation efficiency is low, a device in a simple structure capable of efficiently separating materials to be treated is desired.

The first objective of the present invention is to provide a floatation separation apparatus in a simple structure capable of efficiently separating materials to be treated, and the second objective is to provide the relevant floatation separation method. The third objective of the present invention is to provide a simple floatation separation method for efficiently separating unburnt carbon contained in fly ash. The fourth objective of the present invention is to provide a simple manufacturing method for efficiently manufacturing a cement mixture using high-quality fly ash having reduced unburnt carbon content.

Solution to Problem

The floatation separation apparatus in an embodiment of the present invention to achieve the first objective includes: a treatment tank main body having a bottom portion that narrows downward for storing a liquid containing particles of materials to be treated dispersed therein; a circulating means for taking out the liquid to be treated at a position lower than the liquid level of the treatment tank main body and returning the liquid to the bottom portion of the treatment tank main body, thereby circulating the liquid to be treated while forming a vortex flow within the treatment tank main body; and a foaming device for supplying air bubbles to the liquid to be treated from the lower part of the treatment tank main body.

The floatation separation apparatus in another embodiment of the present invention to achieve the first objective includes:

a treatment tank main body having a bottom portion that narrows downward; an outlet for circulation installed at the upper portion of the treatment tank main body; an inlet for circulation installed at the bottom portion of the treatment tank main body; a circulating path connected to the outlet for circulation and the inlet for circulation; a circulating pump installed midway on the circulating path; a foaming device capable of supplying micro bubbles to the lower part of the treatment tank; and a froth overflow port installed at the upper end of the treatment tank main body, and has a structure wherein by taking a part of a liquid to be treated out of the outlet for circulation and returning the liquid through the inlet for circulation along the internal peripheral surface of the treatment tank main body in a state where the liquid to be treated containing impurities is stored in the treatment tank main body, with the liquid level maintained higher than the outlet for circulation, and by injecting air bubbles from the foaming device into the liquid to be treated, a vortex flow is formed in the liquid within the treatment tank main body and the air bubbles are dispersed into the liquid, froths gathered at the center of the vortex flow are made to overflow through the froth overflow port for removal, and tails containing impurities decreased by the amount contained in the froths are recovered.

The floatation separation method in an embodiment of the present invention to achieve the second objective includes: storing a liquid to be treated containing particles of materials to be treated dispersed therein in a treatment tank main body having a bottom portion that narrows downward; taking out the liquid to be treated at a position lower than the liquid level of the treatment tank main body and returning the liquid to the bottom portion of the treatment tank main body, thereby circulating the liquid to be treated while forming a vortex flow within the treatment tank main body; and supplying air bubbles to the liquid to be treated from the lower part of the treatment tank main body to separate a first component contained in froths from a second component, which is less susceptible to floatation than the first component, contained in the liquid to be treated.

The floatation separation method in another embodiment of the present invention to achieve the second objective includes: storing a liquid to be treated containing particles of materials to be treated, with impurities to be treated dispersed therein, in a treatment tank main body having a bottom portion that narrows downward, with the level of the liquid to be treated maintained higher than an outlet for circulation; taking out the liquid to be treated from the outlet for circulation and returning the liquid through an inlet for circulation at the bottom portion using a circulating pump while injecting air bubbles into the lower part of the treatment tank main body, thereby forming a vortex flow in the liquid to be treated contained in the treatment tank main body and dispersing the air bubbles within the liquid to be treated; gathering froths containing impurities at the center of the vortex flow to cause overflow to occur for removal; and recovering tails having decreased impurities remaining within the treatment tank main body.

With the floatation separation method of the present invention to achieve the third objective, particles of materials to be treated are fly ash, and the first component or impurity is unburnt carbon.

With the method of manufacturing a product using the device and the method of the present invention to achieve the fourth objective, a second component or tails separated by the floatation separation method is/are kneaded with cement under the existence of water.

The method of manufacturing another product using the device and the method of the present invention to achieve the fourth objective kneads at least cement, water, and aggregate to manufacture a cement mixture, wherein the second component or tails separated by the floatation separation method is/are mixed in as at least a part of the aggregate.

Advantageous Effect of Invention

According to the floatation separation method of the present invention, by taking out the liquid to be treated from the treatment tank main body and returning the liquid to the bottom portion of the treatment tank main body that narrows downward, the liquid to be treated is circulated while a vortex flow is formed, and at the same time air bubbles are supplied from the lower part of the treatment tank main body to the treatment tank main body. Consequently, air bubbles can be dispersed widely within the liquid, which allows the particles of materials to be treated to contact the air bubbles thoroughly. In addition, floatation separation can be performed without breaking the attachment between the air bubbles and the first component within the treatment tank main body, meaning that components within the material to be treated can be separated by floatation efficiently with a simple structure.

If fly ash is separated by floatation by the floatation separation method of the present invention, unburnt carbon contained in the fly ash can be separated efficiently with a simple structure. It is therefore possible to prevent unburnt carbon-related problems from occurring, and obtain a large amount of high-quality fly ash.

According to the method of manufacturing products using the device and the method of the present invention, a cement mixture is manufactured using fly ash from which unburnt carbon has been separated and removed thoroughly by the floatation separation method described above, meaning that a cement mixture using fly ash can be manufactured efficiently with a simple structure. In addition, since a large amount of fly ash can be used, a flat surface can be formed, for example, and a cement mixture that ensures various improved qualities after hardening, including unsusceptibility to dry shrinkage distortion and improved compressive strength, can be manufactured.

DESCRIPTION OF EMBODIMENTS

Figure 1:
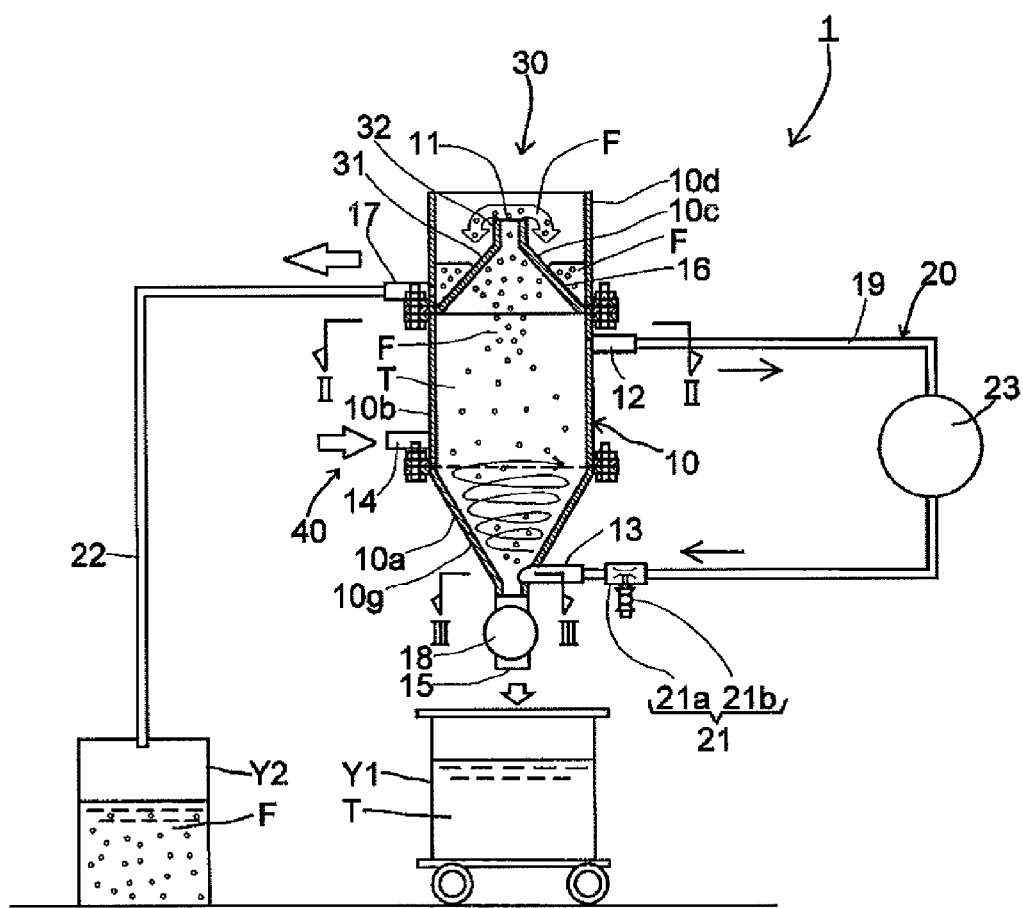
FIG. 1 is a longitudinal front sectional view showing the floatation separation apparatus according to the first embodiment of the present invention.

The floatation separation apparatus and method according to some embodiments of the present invention will hereinafter be described in detail by referring to the drawings.

[First Embodiment]

Figure 2:
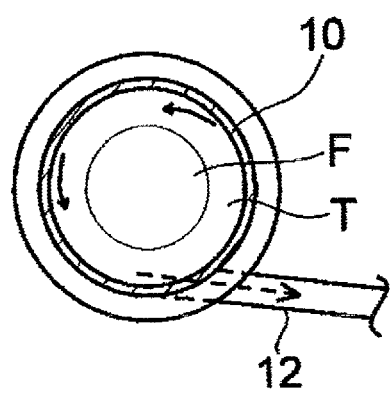
FIG. 2 is a cross-sectional view along the line II-II in FIG. 1.
Figure 3:
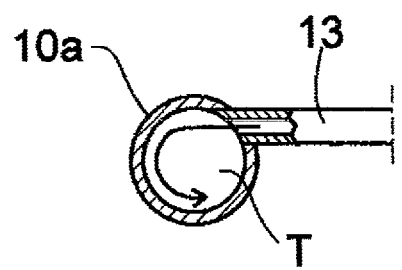
FIG. 3 is a cross-sectional view along the line III-III in FIG. 1.

The floatation separation apparatus and method of the first embodiment will be described first by referring to FIGS. 1 to 3.

[Floatation Separation Apparatus]

The floatation separation apparatus is used to subject a liquid containing particles of materials to be treated to floatation separation.

Any materials, including solids or powder such as fly ash, metals, and minerals, general drainage and other effluent, industrial waste liquids containing heavy metals, slurry such as sludge, can be treated, provided that they contain particles capable of forming a dispersion liquid when used as they are or by being dispersed into various dispersion media.

Particles in the material to be treated contain a first component having relatively low wettability and a second component having wettability higher than that of the first component, and may contain other components. Each component may be a pure material or a mixture. For example, if the particles of the material to be treated are fly ash, the first component is unburnt carbon or particles containing unburnt carbon, etc., and the second component is particles having ash content or unburnt carbon content lower than that of the first component such as reformed fly ash.

It is preferable that the liquid to be treated contain particles of the first component and particles of the second component separated from each other. In this liquid to be treated, the first component and the second component may be contained together in the same particle, and the particles of the first component and those of the second component may be attached and coagulated. When the first component and the second component are contained in the same particle or attached or coagulated, floatation separation can be performed depending on the percentage of existence of the first component and the second component, and the components can be subjected to floatation separation within the floatation separation apparatus 1 while being separated from each other.

As shown in FIG. 1, the floatation separation apparatus 1 for separating a liquid containing materials to be treated by floatation separation includes a treatment tank main body 10, a circulating means 20, and a foaming device 21. The treatment tank main body 10 is for storing the liquid containing particles of materials to be treated. The circulating means 20 is for circulating the liquid while forming a vortex flow within the treatment tank main body 10 by taking out the liquid in the treatment tank main body 10 and returning the liquid to the bottom portion 10g of the treatment tank main body 10. The foaming device 21 is for supplying air bubbles to the liquid from the lower part of the treatment tank main body 10. The floatation separation apparatus 1 in the first embodiment is equipped with an overflowing means 30 for separating froths F rising to the surface of the liquid to be treated. This floatation separation apparatus 1 is also equipped with a water adding means 40 for feeding a liquid different from the liquid to be treated to the treatment tank main body 10.

The treatment tank main body 10 of the floatation separation apparatus 1 is a vessel having a bottom capable of storing a liquid to be treated. The shape of the treatment tank main body 10 is not limited, and the cross-sectional shape of the internal wall in the horizontal direction may be a polygonal shape or circle, for example. It is preferable that the treatment tank main body 10 be in a shape capable of forming a vortex flow without difficulty such as a circle.

The treatment tank main body 10 has a bottom portion 10g that narrows downward. Any bottom portions 10g are acceptable, provided that the bottom portion has a bottom face whose horizontal cross-sectional area decreases toward the bottom. This bottom portion 10g may be in a shape of a circular cone or pyramid according to the horizontal cross-sectional shape of the treatment tank main body 10. It is preferable that the bottom portion 10g be capable of discharging the liquid within the treatment tank main body 10 by gravity.

The treatment tank main body 10 in this embodiment is an assembly divided into the following four regions: lower part 10a of the treatment tank having a bottom portion 10g, central part 10b of the treatment tank, upper portion 10c of the treatment tank, and froth recovering frame portion 10d. The treatment tank main body 10 has a froth overflow port 11, outlet for circulation 12, inlet for circulation 13, water inlet 14, and tail recovery port 15. A froth recovery tray 16 is provided around the froth overflow port 11, and a froth recovery port 17 is provided to the froth recovery tray 16.

The central part 10b of the treatment tank has a vertical cylindrical tank wall capable of storing the liquid to be treated and forming a vortex flow, and an outlet for circulation 12 for taking the liquid circulated by a circulating means 20 out of the treatment tank main body 10 is provided in the upper portion. As described later, the outlet for circulation 12 is formed at a position lower than the level of the liquid stored in the treatment tank main body 10 to prevent froths F accumulated on the liquid surface from flowing into the circulating path 19. As shown in FIG. 2, it is preferable that this outlet for circulation 12 be provided in the tangential direction of the inner peripheral surface of the treatment tank main body 10, for example, so that the liquid is discharged along the inner peripheral surface of the treatment tank main body 10, which facilitates forming a vortex flow.

The lower part 10a of the treatment tank has a bottom portion 10g in a shape of a circular cone, and in the lower end of the bottom portion 10g, an inlet for circulation 13, through which the liquid circulated by the circulating means 20 is returned to the treatment tank main body 10, is provided. As shown in FIG. 3, it is preferable that this inlet for circulation 13 be provided in the tangential direction of the inner peripheral surface of the treatment tank main body 10, for example, so that the liquid returned from the circulating means 20 is made to flow in along the inner peripheral surface of the treatment tank main body 10. It is ideal if this inlet for circulation 13 is provided so that the liquid flows in not horizontally but slightly upwards because floatation of particles of materials to be treated is facilitated. Furthermore, it is ideal that the direction of the liquid discharged from the outlet for circulation 12 and the direction of the liquid flowing into the inlet for circulation 13 are along the vortex flow within the treatment tank main body 10, which facilitates forming a vortex flow. On the cylindrical portion at the lower end of the bottom portion 10g, a tail recovery port 15 is provided, and a gate valve 18 is provided at the tail recovery port 15.

The circulating means 20 of the floatation separation apparatus 1 includes a circulating path 19 connected between the outlet for circulation 12 and the inlet for circulation 13, and a circulating pump 23, which is installed midway on the circulating path 19, for taking out the liquid from the outlet for circulation 12 by suction and pressure-feeding the liquid to the inlet for circulation 13.

This circulating means 20 takes the liquid in the treatment tank main body 10 out of the outlet for circulation 12 and returns the liquid through the inlet for circulation 13, thereby circulating the liquid while forming a gentle vortex flow within the treatment tank main body 10. It is desirable that the vortex flow be gentle enough to include no turbulent flow, and a laminar vortex flow is ideal.

A gentle vortex flow need not be formed in the entire treatment tank main body 10, provided that air bubbles and particles contact each other within the treatment tank main body 10 to allow floatation separation to occur. For example, a vortex flow may be formed on the surface of the liquid to be treated or in the central part 10b of the treatment tank main body 10. It is ideal that this vortex flow has a flow rate that allows froths F going up to the liquid surface to be gathered at the center of the vortex flow, or higher.

A turbulent vortex flow may be formed at the bottom portion 10g of the treatment tank main body 10 to facilitate flotation of particles of the materials to be treated. The liquid to be treated may be transferred through the circulating path 19 in a state of laminar flow or turbulent flow, but if particles or the first component and the second component are attached and coagulated, a turbulent flow may be selected to facilitate separation.

The foaming device 21 of the floatation separation apparatus 1 injects air bubbles from the lower part of the treatment main unit 10 into the liquid to be treated. With this foaming device 21, air bubbles may be directly supplied into the treatment tank main body 10, but it is desirable that the device be installed midway on the circulating path 19, and that air bubbles be supplied to the liquid while it is being transferred within the circulating path 19 to allow them to return to the treatment tank main body 10 with the liquid.

As this foaming device 21, an aeration tube, etc. may be used, but it is preferable that a suction foaming device such as ejectors installed in series midway on the circulating path 19 be used. The suction foaming device is equipped with a path for the liquid to be circulated and a suction path installed facing the path for the liquid to be circulated. With such a suction foaming device, by allowing the liquid to flow within the path, a part having negative pressure is formed, and air is sucked from the suction path at the part having negative pressure, and air bubbles are taken into the flowing liquid. By using such a suction foaming device, foaming is facilitated. In addition, when the liquid passes through the suction foaming device, attached and coagulated particles or the first and the second components can be separated easily thanks to mechanical shearing force, pressure of the liquid to be treated, or change in flow rate, which is preferable.

The smaller the particle diameter of air bubbles supplied to the liquid to be treated is, the faster the floatation speed and larger the surface area are, which is desirable because attachment between particles and air bubbles is facilitated. As the foaming device 21, the one capable of supplying a large number of air bubbles containing minute bubbles is desirable, and the one capable of generating a number of air bubbles containing at least micro bubbles is preferable. These micro bubbles have micro-level particle diameter, and contain air bubbles having the particle diameter of 100 µm or smaller, more preferably several dozen µm or smaller, for example. Air bubbles of 10 µm or larger may be adopted for a reason that air bubbles can be formed easily. It is ideal that the modal value of the air bubbles generated be 50 µm or smaller, more specifically between 30 µm or larger but not higher than 50 µm. If the foaming device 21 is installed on the circulating path 19, it is desirable that the foaming device 21 be installed on the circulating path 19 at a position downstream of the circulating pump 23, or near the inlet for circulation 13.

The foaming device 21 in this embodiment includes a micro bubble generator 21a consisting of ejectors installed midway on the circulating path 19 downstream of the circulating pump 23, and an air supply volume control valve 21b connected to the suction port of the micro bubble generator 21a. The micro bubble generator 21a includes a venturi passageway for feeding the liquid to be treated supplied from the circulating pump 23 to the inlet for circulation 13, a plurality of fine tubes facing the small-diameter passageway portion of the venturi passageway and having open tips, and a manifold communicating with the base of the plurality of fine tubes and having a port for communicating with the air, for example. With this micro bubble generator 21a, micro bubbles are fed from the air supply volume control valve 21b connected to the port for communicating with air to the small-diameter passageway portion, namely a negative pressure generating portion of the venturi passageway, and the micro bubbles are thus injected into the liquid to be treated.

Examples of such a micro bubble generator 21a include YJ nozzle (trade name) manufactured by Enviro Vision Co., Ltd. capable of generating micro bubbles having modal air bubble diameter values falling within the 30 µm to 50 µm range. The micro bubble generator need not be equipped with an air supply volume control valve 21b.

The overflowing means 30 of the floatation separation apparatus 1 separates froths F containing the first component of the particles of the materials to be treated and having emerged on the liquid surface from the liquid to be treated containing the second component, which is less susceptible to floatation than the first component. This overflowing means 30 may be equipped with a narrowing portion 31 that narrows upward toward the upper portion 10c of the treatment tank, and a froth overflow port 11 installed at the upper end of the narrowing portion 31. Any narrowing portions 31 are acceptable, provided that the narrowing portion has a slanting surface allowing the horizontal cross-sectional area to decrease toward the top, and a shape of a circular cone or pyramid corresponding to the horizontal cross-sectional shape of the treatment tank main body 10 may be adopted. Using this overflowing means 30, the froths F having accumulated and grown on the liquid surface are made to overflow from the froth overflow port 11, guided by the narrowing portion 31, and flow down in the froth recovery frame portion 10d.

With the floatation separation apparatus 1 in this embodiment, the upper portion 10c of the treatment tank and the froth recovery frame portion 10d of the treatment tank main body 10 constitute the overflowing means 30 of the floatation separation apparatus 1. This overflowing means 30 include a circular-cone-shaped narrowing portion 31, and a cylindrical portion 32 extending from the top edge of the narrowing portion 31. The froth overflow port 11 is the horizontal top opening of the cylindrical portion 32. On the top outer periphery of the upper portion 10c of the treatment tank, a froth recovery tray 16 is provided, and the froth overflow port 11 is placed at its center. Space for recovering froths is formed around the froth recovery tray 16, allowing froths F having flowed down onto the froth recovery tray 16 to be recovered in a vessel Y2 through the froth recovery port 17 and the froth recovery tube 22.

The water adding means 40 of the floatation separation apparatus 1 is intended to provide the liquid to be treated within the treatment tank main body 10 with another liquid, dispersing agent such as water for example, to prepare untreated liquid containing particles of the materials to be treated within the treatment tank main body 10 and adjust the liquid level. It is desirable that the level of the liquid to be treated be adjusted to remain higher than the outlet for circulation 12 during floatation separation, and that on completion of the floatation separation, the level be increased to allow the froths F accumulated on the liquid surface to overflow from the overflowing means 30.

With this embodiment, a water inlet 14 is provided at the lower part of the central part 10b of the treatment tank, and connected to a water source such as a faucet. The position of the water inlet 14 is not limited, provided that the position is lower than the outlet for circulation 12, because the liquid level is hardly disturbed when water is added, and froths F can thus be separated easily.

[Floatation Separation Method]

The floatation separation method will hereinafter be described by referring to FIGS. 1 to 3.

By this floatation separation method, the liquid to be treated having dispersed particles of the materials to be treated is stored in the treatment tank main body 10, the liquid is circulated while a vortex flow is formed within the treatment tank main body 10 and air bubbles are supplied to the liquid. By separating froths F from the liquid, the first component contained in the froths F is separated from the second component, which is less susceptible to floatation than the first component, contained in the liquid.

First, the particles of the materials to be treated are stored in the treatment tank main body 10 in a state of a suspension liquid as a liquid to be treated. The liquid may be prepared using a dispersing agent. Preparation of the liquid to be treated may be performed before storing the liquid in the treatment tank main body 10, or within the treatment tank main body 10. The liquid may be stored in the treatment tank main body 10 as it is as the liquid to be treated, provided that the particles of the materials to be treated are contained in the suspension liquid in a state separable by floatation.

Particles of the materials to be treated may be pretreated prior to the preparation of the liquid to be treated. Pretreatment includes crashing of objects of treatment, making them in a state of slurry, and treatment for promoting separation. The treatment for promoting separation means to add a collecting agent to the particles of the materials to be treated, and mix or agitate them, thus increasing the difference in wettability between the first and the second components.

A dispersing agent for preparing the liquid to be treated is selectable depending on the particles of the materials to be treated. For example, if separation is to be conducted based on the difference in wettability between the first and the second components, namely the difference in hydrophobic property, aqueous liquids such as water, aqueous solution, and aqueous suspension liquid can be used. A foaming agent, etc. such as surface active agent can be added to the dispersing agent.

Any concentrations of the particles of the materials to be treated in the liquid are acceptable, provided that the liquid can be circulated by the circulating means 20, and a gentle vortex flow can be formed within the treatment tank main body 10 at a pressure allowing the liquid to be returned to the treatment tank main body 10 by the use of the circulating means 20.

Particles of the materials to be treated or the liquid to be treated can be taken in the treatment tank main body 10 through the froth overflow port 11, for example, with the liquid level remained higher than the outlet for circulation 12 in the treatment tank main body 10. The liquid level can be adjusted by adding water using the water adding means 40.

After the liquid to be treated is taken in the treatment tank main body 10, by taking out the liquid from the upper portion of the treatment tank main body 10 and returning the liquid to the bottom portion 10g of the treatment tank main body 10 using the circulating means 20, the liquid can be made to circulate while a vortex flow is formed within the treatment tank main body 10.

If the circulating pump 23 is started, the circulating means 20 starts sucking the liquid within the treatment tank main body 10 from the outlet for circulation 12 in the upper portion of the treatment tank main body 10, and allows the liquid to be pressure-fed beck into the bottom portion 10g of the lower part 10a of the treatment tank from the inlet for circulation 13, specifically the lower part of the circular cone portion.

If the liquid is circulated by the circulating means 20, a gentle upward flow is formed in the liquid in the treatment tank main body 10, and furthermore, a gentle vortex flow is generated in the liquid in the treatment tank main body 10. At the lower part of the treatment tank main body 10, a vortex flow is formed depending on the flow rate and volume of the returned liquid, and the flow becomes a gentle vortex flow at the central part 10b of the treatment tank main body 10, which allows the entire liquid within the treatment tank main body 10 to be agitated in the upward and horizontal directions.

The volume and the flow rate of the liquid in the circulating means 20 and the flow rate of the vortex flow formed by the circulating means 20 can be adjusted as required depending on the properties, etc. of the liquid to be treated, but it is preferable that the adjustment be made within the range where a desirable vortex flow can be formed within the treatment tank main body 10. For example, the circulation volume may be adjusted to obtain a capacity 0.5 to 2.5 times the volume of the liquid to be treated in the treatment tank main body 10 in a minute.

While the liquid to be treated is circulated by the circulating means 20, air bubbles are supplied into the liquid using the foaming means 21.

To supply air bubbles into the liquid to be treated in the treatment tank main body 10, the foaming device 21 is started in synchronization with the operation of the circulating pump 23. In the case of a suction foaming device, by operating the circulating pump 23, air bubbles are taken into the liquid circulated downstream of the circulating pump 23, and a large number of air bubbles are supplied to the lower part of the treatment tank main body 10 along with the liquid to be returned. The amount of injection of air bubbles by the foaming device 21 may be adjusted as required depending on various properties, etc. of the liquid to be treated. In this embodiment, by adjusting the air supply volume control valve 21b, the supply volume of air bubbles to be taken into the liquid can be adjusted.

If the liquid to be treated is circulated within the treatment tank main body 10 while a vortex flow is formed and air bubbles are supplied to the liquid, floatation separation of the liquid is performed within the treatment tank main body 10. Within the treatment tank main body 10, the particles of the materials to be treated within the liquid and a large number of air bubbles supplied contact each other, and the first component of the particles of the materials to be treated attach to, or accompany, the air bubbles and surfaces as froths F. At this time, since the vortex flow is gentle, the first component and the air bubbles can go up together without their attachment being broken.

If the supplied air bubbles are micro bubbles, they can stay in the liquid for a long time thanks to their high internal pressure, and since the number of air bubbles and the total surface area are large, the probability of their contacting the first component is much higher than ordinary air bubbles. By supplying a number of micro bubbles, the first component can be made to go up.

The froths F go up while being collected toward the center of the liquid surface due to the vortex flow within the treatment tank main body 10, and then accumulate and grow on the surface of the liquid by being pushed up by the froths F having reached the liquid surface.

The froths F growing on the liquid surface is guided by the narrowing portion 31 of the overflowing means 30 to reach the froth overflow port 11 and overflow, being separated from the liquid to be treated within the treatment tank main body 10. Overflowing froths F are recovered in the vessel Y2 through the froth recovery frame portion 10*d* and the froth recovery tube 22.

As a result of continuing circulation and supply of air bubbles using such a circulating means 20 and a foaming device 21, contact between the particles of materials to be treated within the liquid and air bubbles keeps occurring repeatedly, thus allowing the first component to be separated thoroughly as froths F.

When the content of the first component of the liquid has reached a desired range, floatation separation is completed. For example, the treatment time may be set in advance depending on the type of materials to be treated, and the treatment can be stopped when the set treatment time has elapsed.

After the floatation separation is completed, water is added to the treatment tank main body 10 by the water adding means 40 to increase the liquid level, thus allowing froths F remaining within the treatment main unit 10 to overflow from the froth overflow port 11. At this time, the froths F may be made to overflow by adding water to the treatment tank main body 10 while operating the circulating pump 23. Or the operation of the circulating pump may be stopped, and then water may be added to the treatment tank main body 10 to allow the froths F remaining in the treatment tank main body 10 to overflow.

After the froths F remaining in the treatment tank main body 10 is made to overflow, the liquid containing the second component, which is less susceptible to floatation than the first component when being contacted with air bubbles and thus remaining in the treatment tank main body 10, is recovered. With this device, it is made to flow down as tails T from the tail recovery port 15, and is recovered in vessel Y1 by opening the gate valve 18 at the lower part of the treatment tank main body 10.

As a result of separating and recovering froths F, and recovering the liquid within the treatment tank main body 10, the first component contained in the froths F and the second component, which is less susceptible to floatation than the first component, can be recovered separately. One of the recovered components, or both, can then be subjected to post treatment such as condensation, dilution, and purification as required, and used for various purposes.

According to the floatation separation apparatus 1 and the floatation separation method described above, air bubbles are supplied to the treatment tank main body 10 from its lower part, while the liquid to be treated is made to circulate. Consequently, air bubbles can be attached to the particles of the materials to be treated in the liquid repeatedly, which ensures thorough separation between the first component and the second component contained in particles of the materials to be treated. In addition, the liquid is taken out of the treatment tank main body 10 and returned to the treatment tank main body 10 using the circulating means 20. Consequently, even if the first component and the second component are attached and coagulated, they can be separated during circulation and subjected to floatation separation. As a result, floatation separation of particles of materials to be treated can be conducted in a simple structure without providing a device having a complicated structure, or providing treatment tank main body 10 for multiple stages.

According to the floatation separation apparatus 1 and the floatation separation method described above, the liquid to be treated is made to circulate by taking out the liquid from the upper portion of the treatment tank main body 10 and returning it to the bottom portion 10*g* of the treatment tank main body 10. Consequently, a gentle upward flow can be formed in the liquid to be subjected to floatation separation without having mechanical impact or applying shearing force on the liquid within the treatment tank main body 10, and the liquid can be agitated in the upward direction. Furthermore, by returning the liquid to the bottom portion 10*g* of the treatment tank main body 10, a vortex flow is formed within the treatment tank main body 10. Consequently, a gentle vortex flow can be formed in the liquid to be subjected to floatation separation without having mechanical impact or applying shearing force on the liquid within the treatment tank main body 10, and the liquid can be agitated in the horizontal direction.

As a result, particles of the materials to be treated and air bubbles can be dispersed over the entire liquid to be subjected to floatation separation, the particles of the materials to be treated and the air bubbles are made to contact with and attach to each other, and the state of attachment between the particles of the materials to be treated and the air bubbles can be prevented from being broken. Floatation separation can thus be promoted.

With this floatation separation apparatus 1 and the floatation separation method, the treatment tank main body 10 has a bottom portion 10*g* that narrows downward, to which the liquid is returned. Consequently, an upward flow and a vortex flow can be generated easily within the entire liquid contained in the treatment tank main body 10. In addition, compared to the liquid in the middle and upper portion of the treatment tank main body 10 to be subjected to floatation separation, the upward flow and the vortex flow around the bottom portion 10*g* of the treatment tank main body 10 can be made stronger. As a result, retention or sedimentation and accumulation of the liquid or particles of the materials to be treated in the bottom portion 10*g* of the treatment tank main body 10 can be prevented without fail, and the particles of the materials to be treated can be dispersed more widely. Even if a strong turbulent vortex flow is not formed within the entire treatment tank main body 10, the particles of the material to be treated and the air bubbles can be dispersed thoroughly, and as many particles of the materials to be treated and air bubbles as possible can be made to contact each other.

According to the present invention, while preventing the attachment between the particles of the materials to be treated and air bubbles from being broken by having a strong mechanical impact or applying shearing force to the liquid to be treated, the particles of the material to be treated and air bubbles can be made to disperse widely in the liquid and thus contact each other thoroughly. Furthermore, efficient separation between the first component and the second component is achieved by the simple structure thanks to the difference in surface wettability, and the device can thus be structured compact.

In addition, since the driving source of the floatation separation apparatus 1 is the circulating pump 20 only, running cost is low, and energy can be saved.

According to this floatation separation apparatus 1 and the floatation separation method, air bubbles are supplied by the foaming device 21 to the liquid to be treated circulated by the circulating means 20, and the liquid is returned to the treatment tank main body 10, which facilitates dispersing air bubbles in a wide range of the treatment tank main body 10, allows as many particles and air bubbles as possible to contact each other, and thus ensures efficient floatation separation.

According to this floatation separation apparatus 1 and its method, froths F that have accumulated on the liquid surface within the treatment tank main body 10 are guided in the overflowing means 30 to the froth overflow port 11 along the narrowing portion 31 that narrows upward, and made to overflow from the port. Consequently, the froths F can be collected to the froth overflow port 11 that has a cross-sectional area smaller than the surface area of the liquid to be treated and made to overflow from that port. It is therefore possible to facilitate recovering the froths F by increasing the rising speed of the froths, thus allowing them to overflow easily from the froth overflow port 11. Furthermore, when the liquid and the froths F are separated by increasing the level of the liquid to make the froths F overflow, the froths F can be separated from the liquid thoroughly because the cross-sectional area decreases upward, and thus the separation accuracy can be improved.

This floatation separation apparatus and its method can be used preferably as a fly ash reforming device and method. Fly ash can be separated as particles of the materials to be treated using this floatation separation apparatus 10 and the floatation separation method, and unspent carbon, which is impurity, can be separated and removed as the first component. Since unburnt carbon can thus be decreased sufficiently, fly ash that is usable as various materials, preferably the fly ash having unburnt carbon content as low as 5 wt %, more preferably the fly ash having unburnt carbon content as low as 3 wt %, can be obtained efficiently with a simple structure.

Furthermore, since the fly ash thus obtained has sufficiently low unburnt carbon content, adverse effect of the unburnt carbon is hardly produced, and so a large amount can be used as various raw materials.

The embodiment described above can be changed as required within the scope of the present invention. For example, although the flotation separation apparatus 1 described above has a tail recovery port 15 at the bottom portion 10g of the treatment tank main body 10, the tail recovery port 15 need not be provided, and the treatment tank main body 10 can be turned over after the separation to recover tails from the froth overflow port 11, etc.

In the embodiment described above, the narrowing portion 31 that narrows upward is provided in the upper portion 10c of the treatment tank, and the froth overflow port 11 is provided in the narrowing portion 31. However, the upper portion 10c of the treatment tank may be in a cylindrical form having open upper portion 10c of the treatment tank, and a trough may be provided around it to allow the overflowing froths to flow downward.

With the floatation separation apparatus 1 described above, the particles of the materials to be treated or the liquid to be treated are taken into the treatment tank main body 10 through the froth overflow port 11, but a supply port may be provided separately.

[Second Embodiment]

A fly ash slurry manufacturing device and method using the floatation separation apparatus in the first embodiment and its method will be described by referring to FIG. 4.

The manufacturing device in this embodiment is intended to treat fly ash containing unburnt carbon, and manufacture slurry containing reformed fly ash having unburnt carbon, which is impurity, in low content.

The target of treatment ranges widely from the fly ash having unburnt carbon content as low as approximately 3 wt % to as high as approximately 25 wt %. Conventionally unwanted and unused fly ash, which is therefore treated as industrial waste, can also be treated.

Figure 4:
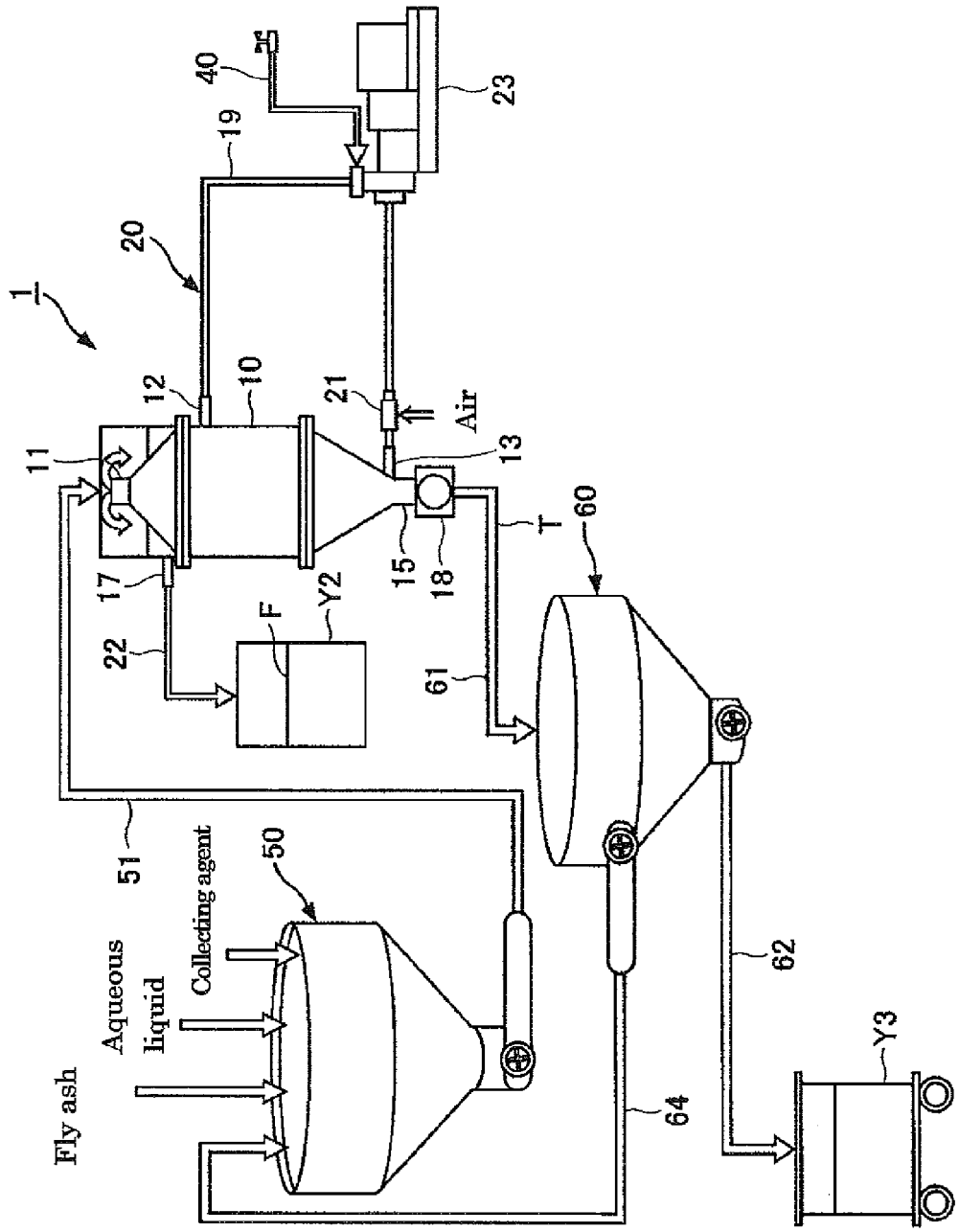
FIG. 4 is a drawing illustrating the concept of the fly ash slurry manufacturing device according to the second embodiment of the present invention.

As shown in FIG. 4, the device in this embodiment includes a pretreatment device 50, a floatation separation apparatus 1 similar to the one in the first embodiment, and a concentrating device 60. With this device, the pretreatment device 50 implements the pretreatment process of pre-treating fly ash and thus manufacturing pretreated slurry, the floatation separation apparatus 1 implements the floatation separation process of subjecting the pretreated slurry to floatation separation, thus reducing or removing unburnt carbon and manufacturing a tail ash suspension liquid, and the concentrating device 60 implements the concentration process of concentrating the tail ash suspension liquid, thus manufacturing a slurry product.

[Pretreatment Process]

In the pretreatment process, fly ash is pre-treated to make it into slurry. In this pretreatment process, treatment for promoting the separation of unburnt carbon can also be conducted along with making slurry. As pretreatment device 50, a slurry mixer, which is used to turn the fly ash into uniform slurry, can be used.

To turn fly ash into slurry, an aqueous liquid is added to the fly ash as a dispersion medium, and kneaded or agitated. Any aqueous liquid, such as water, aqueous solution, and aqueous dispersing liquid, can be used, provided that water to be supplied to the floatation separation process is contained. Preferably, the water recovered in the concentration process to be described later is used.

There is no limitation on the mixing rate of the fly ash and the aqueous liquid. However, if the amount of fly ash is excessively small, the throughput per operation becomes small, decreasing productivity. Meanwhile, if the amount of fly ash is excessively large, high viscosity of the slurry prevents kneading or agitation from being conducted smoothly. It is therefore desirable that the fly ash content in the aqueous liquid be 60 wt %±30 wt %, more preferably 60 wt %±20 wt %.

As a treatment to promote separation of unburnt carbon, a collecting agent is added to the fly ash before or after it is turned into slurry, and mixed or kneaded, to allow the collecting agent to attach to the unburnt carbon, thus improving hydrophobic property. As a collecting agent, components that can attach to unburnt carbon to improve hydrophobic property, such as coal oil and kerosene, can be used. The amount of collecting agent to be added can be adjusted as required within the range where the hydrophobic property of the unburnt carbon can be improved. In addition, as the treatment to promote separating unburnt carbon, ultrasonic waves having frequency of approximately 950 kHz can be irradiated to the slurried fly ash, or strong agitation can be performed using agitation blades.

The pretreated slurry obtained during the pretreatment process is transferred to the floatation separation apparatus 1 through a pretreated slurry transfer passage 51.

[Floatation Separation Process]

The floatation separation process in this embodiment uses a floatation separation apparatus 1 having the same structure as the first embodiment, but a water adding means 40 is provided in a state where water can be added through a circulating means 20.

In the floatation separation process, floatation separation is performed by preparing the liquid to be treated from pretreated slurry. Although pretreated slurry may be used as it is as the liquid to be treated, a dispersing agent made of an aqueous liquid is generally added and mixed to the pretreated slurry produced in the pretreatment process to prepare a liquid to be treated lower in fly ash concentration than the pretreated slurry. A foaming agent, etc. may also be added to the liquid to be treated. Foaming agents include a surface active agent such as pine oil. Such preparation of the liquid to be treated may be performed in a pretreatment device 50, or in the floatation separation apparatus 1.

The liquid to be treated that has been prepared as described above is a suspension liquid in which fly ash particles are dispersed, and aqueous liquid, foaming agent, collecting agent, etc. are contained in the dispersion media. The fly ash concentration in the liquid to be treated is made to fall within the 5 wt % to 30 wt % range, more preferably within the 10 wt % to 20 wt % range, although the concentration is not limited to the above.

Floatation separation of this liquid can be performed in a manner similar to the first embodiment. By supplying air bubbles into the treatment tank main body 10 using the foaming device 21 while circulating the liquid to be treated by the circulating means 20, air bubbles and unburnt carbon contained in the fly ash are made to contact each other. Since the surface of the unburnt carbon is hydrophobic, the unburnt carbon attaches to the air bubbles, goes up as froths F, and overflows from an overflowing means 30. The unburnt carbon that does not contact air bubbles or does not go up even if having contacted air bubbles is circulated by the circulating means 20 in a state dispersed within the liquid to be treated, and returned to the bottom portion 10g of the treatment tank main body 10, and thus opportunities for such unburnt carbon to contact air bubbles are provided repeatedly.

As a result of repeating the above procedure, the unburnt carbon contained in the liquid is separated as froths F, and fly ash having decreased unburnt carbon content remains in the liquid within the treatment tank main body 10. The floatation separation is completed when unburnt carbon has been separated thoroughly.

Through this floatation separation process, unburnt carbon is recovered in a vessel Y2 through a froth recovery tube 22. Meanwhile, by discharging the liquid remaining in the treatment tank main body 10 from a tail recovery port 15 as tails T, fly ash having reduced unburnt carbon content is recovered as a tail suspension liquid, and transferred to a concentrating device 60 through a tail ash transfer path 61, etc.

In such a floatation separation process, a large amount of unburnt carbon contained in fly ash can be separated in a short time. For example, as shown by examples to be described later, a dispersion liquid of reformed fly ash having unburnt carbon content of 2 wt % or lower can be obtained in a treatment time as short as 30 minutes.

[Concentration Process]

In the concentration process, by concentrating the tail ash suspension liquid in the concentrating device 60, fly ash slurry as a product is obtained. As the concentrating device 60, any ones can be adopted, provided that desired concentration can be obtained. For example, a precipitation equipment, filter press, Instant Dehydration Unit (Kitagawa Iron Works Co., Ltd., trade name), etc. may be used.

In the concentration process, it is preferable that concentration be conducted depending on the application of fly ash slurry. For example, regarding fly ash slurry for manufacturing a cement mixture, if the fly ash concentration is excessively low, the usage of cement component tends to increase when mixed and kneaded with the cement component and other components. Meanwhile if the concentration is excessively high, concentration requires a lot of labor. Or since a large amount of aqueous liquid is added when manufacturing a cement mixture, manufacture also requires a lot of labor. For these reasons, the fly ash concentration in the fly ash slurry for manufacturing a cement mixture may be made to fall within the 60 wt % to 80 wt % range, more preferably within the 70 wt % to 80 wt % range.

Obtained fly ash slurry is recovered in a product slurry vessel Y3 through a slurry recovery path 62, etc. Meanwhile, the recovered water separated from the tail ash suspension liquid in the concentrating device 60 is transferred to the pretreatment device 50 through a recovered water transfer path 64, and used again to manufacture pretreated slurry.

[Fly Ash Slurry]

Since the unburnt carbon content of the fly ash slurry thus obtained has been decreased sufficiently, unburnt carbon-related problems hardly occur even if a large amount is used, and such fly ash slurry can be used as various raw materials in large amounts. Furthermore, since the aqueous liquid concentration has been adjusted, volume is small, which facilitates distribution including transportation and thus ensures various applications.

For example, a cement mixture can be manufactured only by kneading the fly ash obtained as tail ash in the floatation separation apparatus 1 with cement under the existence of water. In this case, fly ash particles can be used as a cement admixture or as an aggregate in a mixture. In addition, the aqueous liquid in the fly ash slurry can be used as part or whole of water constituting the cement mixture.

Specifically, when a cement mixture is manufactured by mixing cement, water, and aggregate, the fly ash having decreased unburnt carbon content in the fly ash slurry can be used as part or whole of the aggregate. To manufacture a concrete mixture by kneading cement, water, fine aggregate such as sand, ballast, etc., the fly ash can be added for kneading as part or whole of the cement admixture or fine aggregate. To manufacture a mortar mixture by kneading cement, water, and fine aggregate such as sand, the fly ash can be added for kneading as part or whole of the cement admixture or fine aggregate. To such cement mixtures, various admixtures such as AE agent can be added.

Such cement mixtures can be used to manufacture various hardening materials. For example, they can be applied to floors and walls to form their surfaces by hardening. Or by allowing them to be molded in a concrete form and harden, structures in desired shapes can be formed. Furthermore, by applying onto the surface of masonry units such as bricks and concrete blocks and allow it to harden, a flat masonry surface can be formed.

Figure 7:
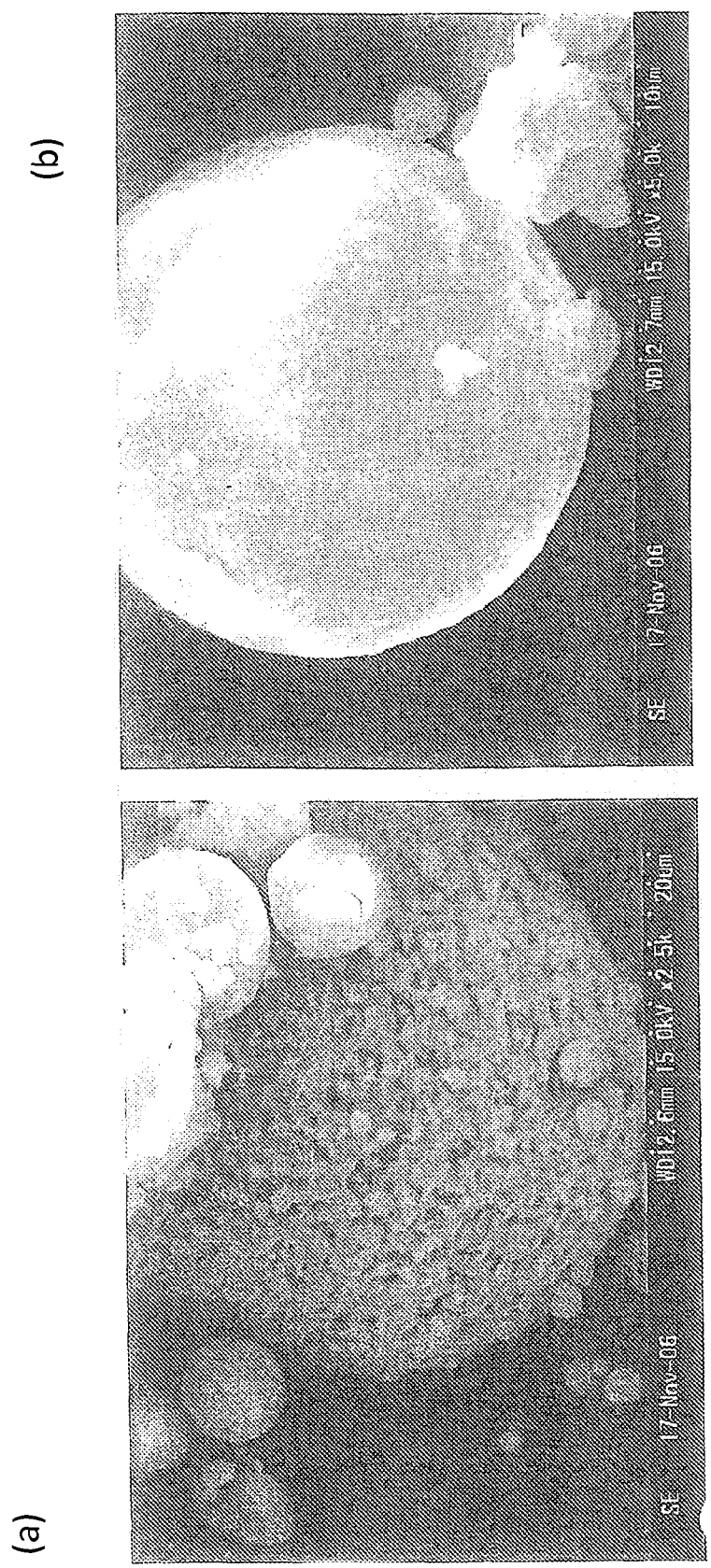
FIG. 7 (*a*) provides an image of conventional fly ash particles, and (*b*) provides an image of particles separated by flotation separation according to the present invention.

In this case, it is advantageous because fluidization promotion function of fly ash can be used. Specifically, conventional fly ash particles have a surface texture as shown in FIG. 7 (a). Meanwhile, the fly ash particles obtained in the first or the second embodiment are spherical particles having a smooth surface as shown in FIG. 7 (b). Consequently, the fly ash particles provide distinguished fluidization promotion function, and if they are used to manufacture various hardening materials, such materials can be filled in a frame space compactly, and a smooth surface can be formed easily.

According to the method of manufacturing a cement mixture as described above, increase in the usage of admixture such as AE agent related to unburnt carbon, appearance of black portions, and decrease in hardening property can be prevented. Furthermore, by hardening such a cement mixture, compressive strength can be improved, dry shrinkage distortion can be minimized, and appearance of cracks on the surface of the hardened material can be prevented. Various qualities after hardening can thus be improved, and excellent hardened materials can be obtained.

Furthermore, since the use of large amounts of fly ash is allowed thanks to decreased unburnt carbon content, such effects can be obtained more prominently by increasing the usage of fly ash. In addition, by increasing the usage of fly ash, a hardened material having desired hardening property can be obtained, which allows a significant reduction in the amount of cement to be used to obtain a desired hardened material and also in the amounts of carbon dioxide generated while cement is manufactured.

In the floatation separation process also, the pH of the liquid to be treated, which remain at pH 11 to pH 12 due to fly ash, is reduced to pH 8 to pH 9 by $CO_2$ contained in the air bubbles. Consequently, if a cement mixture is manufactured using the obtained fly ash slurry, large amounts of $CO_2$ in the atmosphere can be fixed in concrete or mortar as a neutralizing compound.

Reforming fly ash and manufacturing cement mixtures according to the present invention are extremely useful for reducing global environmental load.

EXAMPLE

The examples of the present invention will hereinafter be described.

Example 1

Using the fly ash generated in a thermal power plant in Okinawa (raw ash A) and the fly ash generated in Asahi Kasei No. 3 thermal power plant (raw ash B), floatation separation was conducted using the floatation separation apparatus 1 shown in FIG. 1 under the same conditions, and the amount of unburnt carbon was measured. The amount of unburnt carbon in raw ash A before treatment accounted for 7.72 wt %, and the unburnt carbon content in raw ash B was 6.84 wt %.

Measurement of the amount of unburnt carbon was conducted by taking out each tail when 30 minutes, 60 minutes, 120 minutes, and 180 minutes have elapsed, and by conducting an ignition loss test for each tail.

Figure 5:
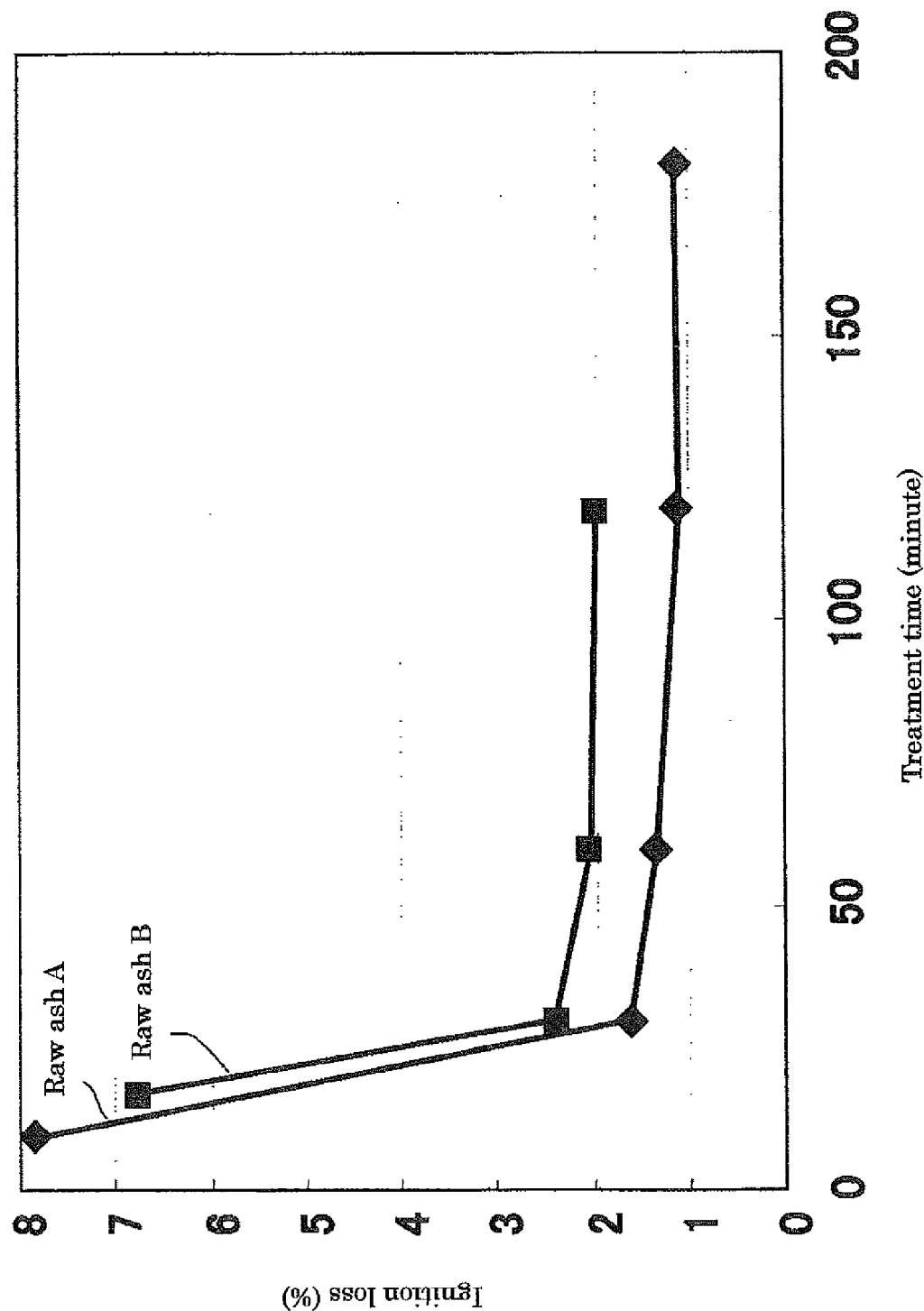
FIG. 5 is a chart showing the result of Example 1.

The results obtained are shown in Table 1 and FIG. 5. The chart in FIG. 5 illustrates the results listed in Table 1. The horizontal axis represents treatment time, whereas the vertical axis represents the ignition loss.

TABLE 1

| Floatation separation | Ignition loss (wt %) | |
|---|---|---|
| | Type of ash | |
| duration | A | B |
| Raw ash | 7.72 | 6.84 |
| 30 min. | 1.62 | 2.39 |
| 60 min. | 1.33 | 2.01 |
| 120 min. | 1.08 | 1.94 |
| 180 min. | 1.14 | — |

As shown in Table 1 and FIG. 5, raw ash A had unburnt carbon content of 7.72 wt %, whereas its ignition loss was found to be 1.61 wt % after floatation separation treatment was performed for 30 minutes. Raw ash B had unburnt carbon content of 6.84 wt %, whereas its ignition loss was found to be 2.39 wt % after floatation separation treatment was conducted for 30 minutes.

From the above, it has been proven that the liquid to be treated containing impurities, which are targeted for separation and removal, can be separated into froths F (impurities) and tails by floatation separation in a short time using the difference in surface wettability of particles to be treated.

In approximately 30 minutes after the flotation separation was started, the rate of decrease in ignition loss has come down and stabilized, which indicates that the floatation separation apparatus 1 shown in FIG. 1 was especially effective at decreasing the ignition loss of fly ash to 3 wt % or lower in a short time.

Comparative Example 1

Floatation separation was performed using fly ash (raw ash C) having unburnt carbon content of 4.33 wt %. In this comparative example 1, floatation separation was conducted without circulating the liquid using the circulating means 20 in the floatation separation apparatus 1 in Example 1.

Instead of a micro bubble generator, an aeration tube having a bore of 60 μm to 800 μm (Spacy Chemical) was installed at the bottom portion 10g of the treatment tank main body 10. The other conditions were the same as Example 1.

Figure 6:
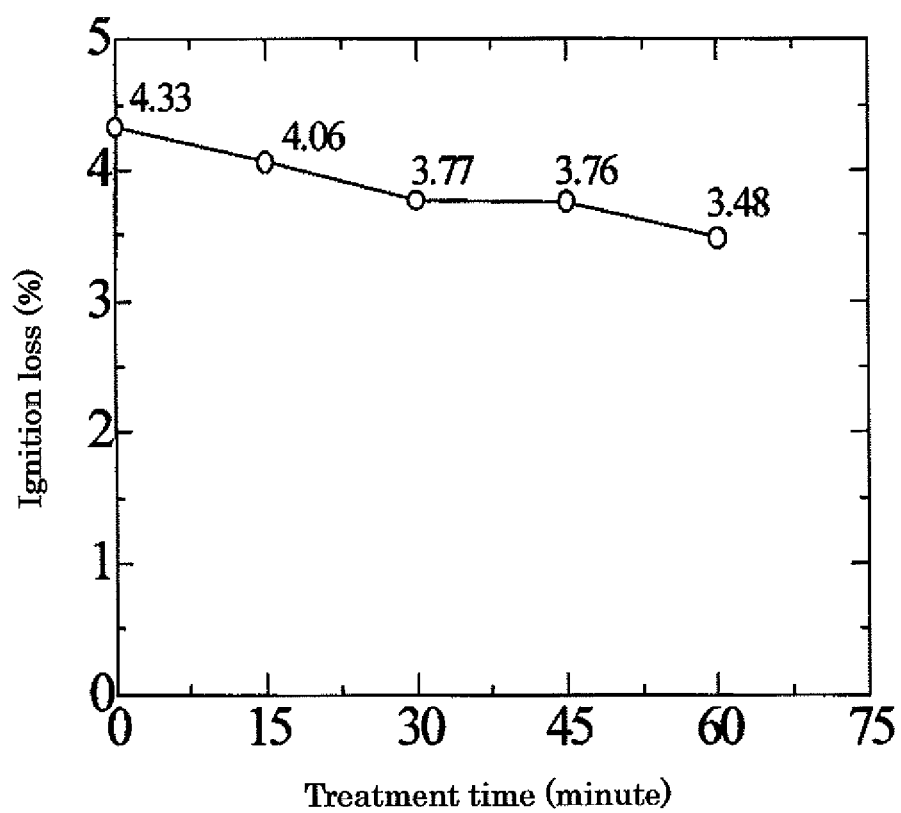
FIG. 6 is a chart showing the result of Comparative Example 1.

The chart in FIG. 6 illustrates the results obtained.

As shown in FIG. 6, the rate of decrease in ignition loss against treatment time after the start of floatation separation was low in Comparative Example 1, and the ignition loss of 3 wt % was not reached even after 60 minutes had elapsed.

Reference Example 1

Fly ash having unburnt carbon content of 3 wt % or lower, water, cement, fine aggregate (sand), and rough aggregate (crashed stone) were kneaded to manufacture a concrete mixture equivalent to the one generated in the Example, the admixture was hardened in frames of desired shapes, and change in dry shrinkage distortion was measured with respect to the drying period of each hardened material.

The concrete mixture was created, with the water-cement (W/C) ratio (ratio of water to cement) maintained constant at 65%, and with the amount of fly ash mixed in the unit concrete volume of 1 $m^3$ set at 0 kg/$m^3$, 85 kg/$m^3$, 244 kg/$m^3$, 332 kg/$m^3$, 455 kg/$m^3$, 640 kg/$m^3$, and 909 kg/$m^3$. The same fly ash and cement were used.

Figure 8:
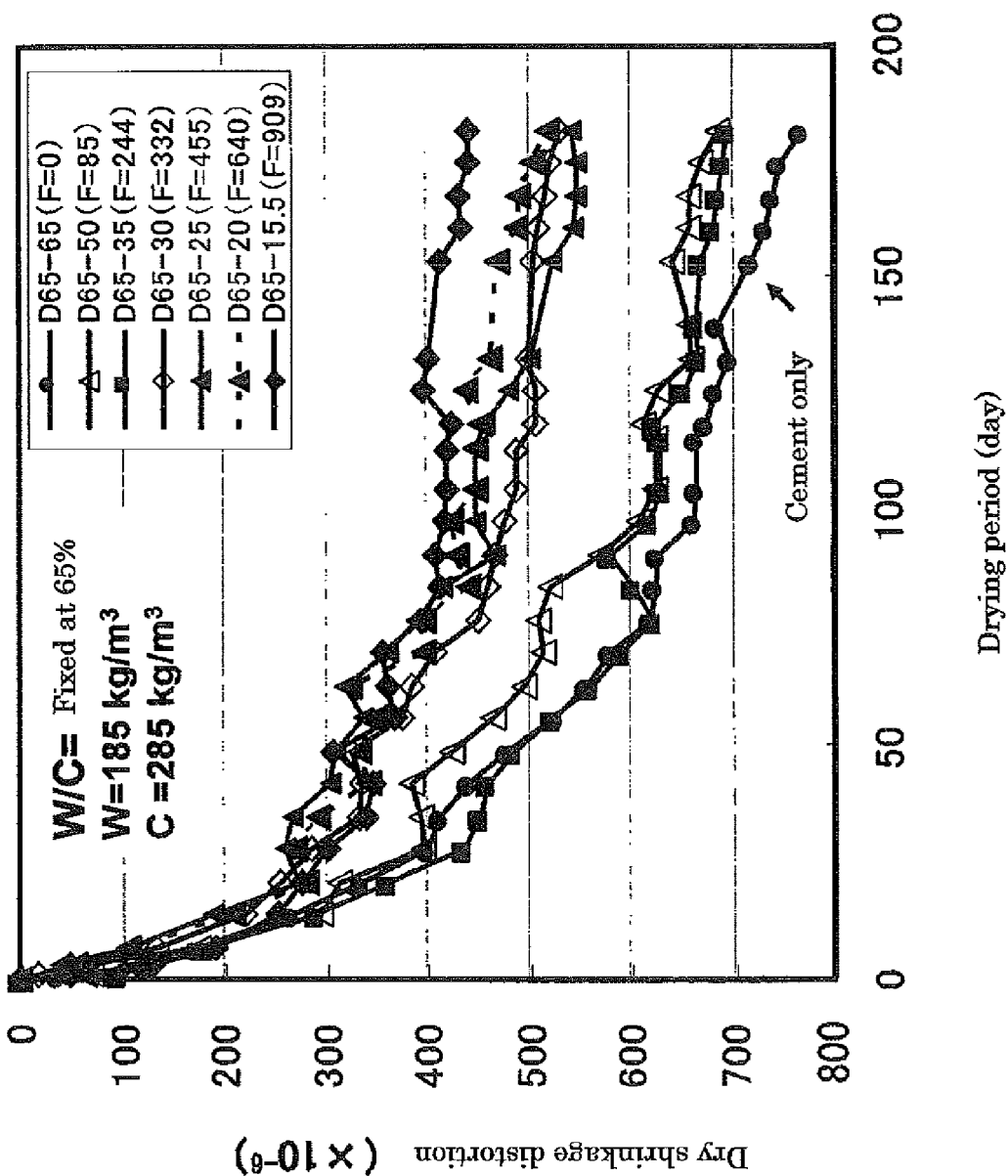
FIG. 8 is a chart showing the result of Reference Example 1.

The results obtained are shown in FIG. 8.

As shown in FIG. 8, the dry shrinkage distortion of the admixture containing fly ash was smaller than the one containing no fly ash, and the larger the amount of fly ash, the smaller the dry shrinkage distortion.

Reference Example 2

Fly ash having unburnt carbon content of 3 wt % or lower, water, cement, fine aggregate (sand), and rough aggregate (crashed stone) were kneaded to manufacture two types of concrete mixtures equivalent to the one generated in the Example, each admixture was hardened in frames of desired shapes to manufacture hardened materials F1 and F2. Hardened material F0 was also created in the same manner as hardened materials F1 and F2, except that it did not contain fly ash.

The water-cement ratio of each concrete mixture was maintained constant at 65%. By adopting different compositions, hardened material F1 was allowed to have medium fluidity, whereas F2 was allowed to have high fluidity. The amount of fly ash mixed in the unit concrete volume of 1 $m^3$ was maintained at 455 kg/$m^3$ for both.

The change with time of compressive strength of each hardened material was measured. The secular change of compressive strength was measured under the following conditions: under water of 20° C., in muddy water in the field, sealed at 20° C., and in the atmosphere. The results are shown in FIG. 9.

Figure 9:
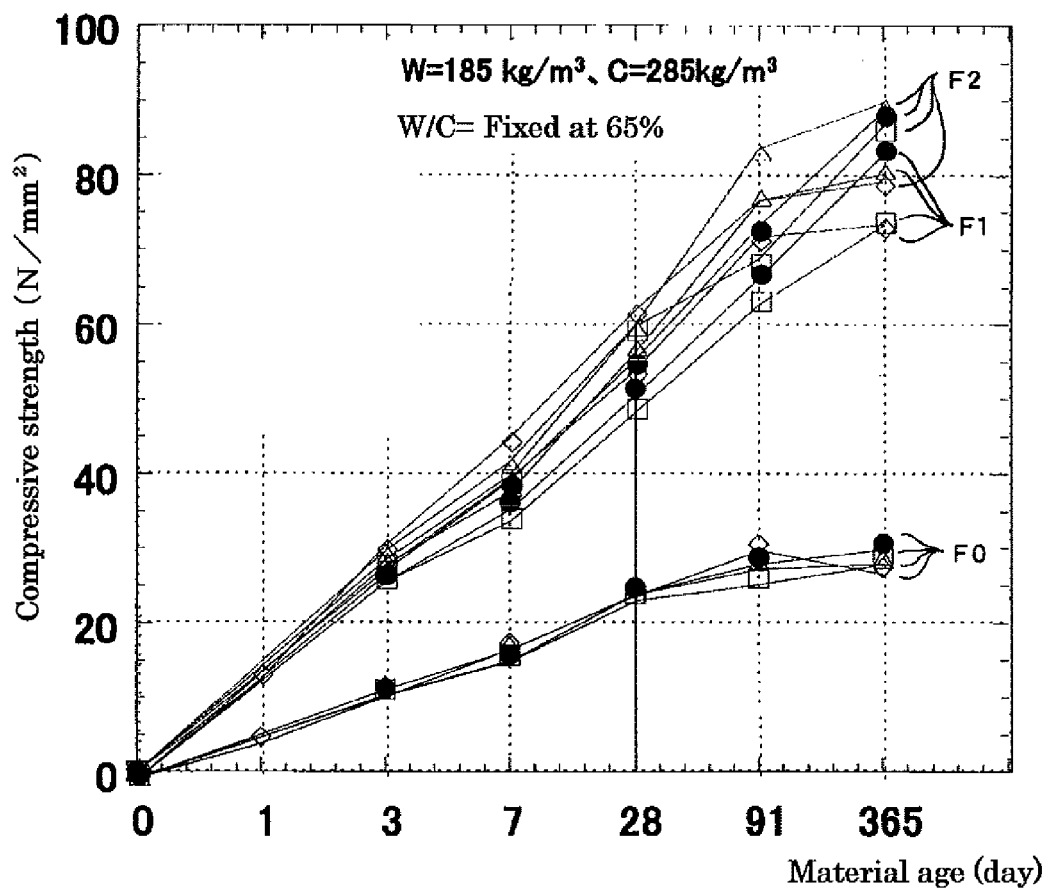
FIG. 9 is a chart showing the result of Reference Example 2.

As shown in FIG. 9, the compressive strength of the one containing fly ash had improved compressive strength compared to the one containing no fly ash. In addition, whereas the curing reaction of the one containing no fly ash had nearly ended and the compressive strength had nearly stabilized by the time the material is one year old, the curing reaction of the one containing fly ash was found to be still in progress even when the material was one year old, which implies that the compressive strength would further increase.

REFERENCE SYMBOL LIST

1: Floatation separation apparatus
10: Treatment tank main body
10g: Bottom portion
11: Froth overflow port
12: Outlet for circulation
13: Inlet for circulation
14: Water inlet
15: Tail recovery port
18: Gate valve
19: Circulating path
20: Circulating means
21: Foaming device
21a: Micro bubble generator
21b: Air supply volume control valve
23: Circulating pump
30: Overflowing means
40: Water adding means

What is claimed is:

1. A floatation separation apparatus, comprising:
a treatment tank main body having a downward narrowing bottom portion, a tank main body circulation outlet and a tank main body circulation inlet, the treatment tank storing a liquid to be treated in which particles of fly ash including unburnt carbon are dispersed;
a froth overflow means installed in an upper portion of the treatment tank main body;
a circulating means for taking out the liquid to be treated from the outlet for circulation and for returning the liquid to the downwardly narrowing bottom portion, thereby circulating the liquid to be treated, and for returning the liquid in the circulation means through said circulation inlet along the internal peripheral surface of the downward narrowing bottom portion, and for forming a vortex flow within the treatment tank main body; and
a foaming device for supplying air bubbles into the circulation liquid between the circulation inlet and circulation outlet,
wherein the outlet for circulation is installed into the upper portion of the main tank body and below said froth overflow means,
wherein by forming the vortex flow by the circulating means while supplying the air bubbles to the circulated liquid by the foaming device, the unburnt carbon contained in the fly ash particles is made to attach to the air bubbles within the treatment tank main body and goes up to a liquid surface at said upper end portion of the tank main body as froths, due to difference in surface wettability between the unburnt carbon and the fly ash in the treatment tank main body.

2. The floatation separation apparatus as set forth in claim 1, wherein the foaming device is made of ejectors.

3. The floatation separation apparatus as set forth in one of claims 1 or 2, wherein the foaming device is capable of supplying micro bubbles into the circulating liquid in said circulation means.

4. The floatation separation apparatus as set forth in claim 3, wherein the froth overflow means includes a narrowing portion that narrows upward, installed at the upper portion of the treatment tank main body, and a froth overflow port installed at the upper end of the narrowing portion.

5. The floatation separation apparatus as set forth in claim 4, wherein the treatment tank main body is equipped with a water adding means, and the level of the liquid to be treated can be adjusted by adding water from the water adding means.

6. The floatation separation apparatus as set forth in claim 1, wherein the foaming device is a suction foaming device.

7. The floatation separation apparatus as set forth in claim 1, further comprising a pretreatment device and a concentrating device.

8. The floatation separation apparatus as set forth in claim 7, wherein the pretreatment device is a mixer which is used to turn the fly ash into uniform slurry.

9. The floatation separation apparatus as set forth in claim 7, wherein the concentrating device concentrates a tail ash suspension liquid, which is obtained from the treatment tank main body.

10. The floatation separation apparatus as set forth in claim 7, wherein the concentrating device is a precipitation equipment or a filter press.

* * * * *